(12) United States Patent
Tomatsu

(10) Patent No.: US 12,304,507 B2
(45) Date of Patent: May 20, 2025

(54) VEHICLE CONTROL DEVICE, VEHICLE, AND VEHICLE SYSTEM

(71) Applicant: TOYOTA JIDOSHA KABUSHIKI KAISHA, Toyota (JP)

(72) Inventor: Nobuyuki Tomatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 18/126,609

(22) Filed: Mar. 27, 2023

(65) Prior Publication Data

US 2023/0311905 A1 Oct. 5, 2023

(30) Foreign Application Priority Data

Apr. 5, 2022 (JP) ................................ 2022-063054

(51) Int. Cl.
*B60W 50/02* (2012.01)
*B60W 50/029* (2012.01)
*B60W 60/00* (2020.01)

(52) U.S. Cl.
CPC ...... *B60W 50/0205* (2013.01); *B60W 50/029* (2013.01); *B60W 60/00* (2020.02); *B60W 2050/0215* (2013.01); *B60W 2422/70* (2013.01); *B60W 2556/45* (2020.02)

(58) Field of Classification Search
CPC .......... B60W 50/0205; B60W 50/029; B60W 60/00; B60W 2050/0215; B60W 2422/70; B60W 2556/45
USPC .......................................................... 701/1
See application file for complete search history.

(56) References Cited

U.S. PATENT DOCUMENTS

| 6,437,688 | B1 | 8/2002 | Kobayashi | |
| 2017/0270798 | A1* | 9/2017 | Ushiba | B60W 60/0059 |
| 2018/0096602 | A1* | 4/2018 | She | G08G 1/166 |
| 2018/0229737 | A1 | 8/2018 | Towal | |
| 2019/0197497 | A1* | 6/2019 | Abari | G05D 1/0088 |
| 2019/0299947 | A1 | 10/2019 | Higashitani et al. | |
| 2020/0307437 | A1* | 10/2020 | Thieberger | B62D 31/003 |
| 2021/0133906 | A1* | 5/2021 | Lota | G07B 15/02 |
| 2021/0146944 | A1* | 5/2021 | Kundu | B60W 50/085 |

(Continued)

FOREIGN PATENT DOCUMENTS

| JP | 2000-330637 A | 11/2000 |
| JP | 2015-042523 A | 3/2015 |
| JP | 2017-019392 A | 1/2017 |

(Continued)

*Primary Examiner* — Isaac G Smith
(74) *Attorney, Agent, or Firm* — Oliff PLC

(57) ABSTRACT

A vehicle system includes an auxiliary vehicle that includes an auxiliary sensor and an auxiliary actuator, and a vehicle that communicates with the auxiliary vehicle. The vehicle includes an in-vehicle sensor that acquires information of an external environment of the vehicle, an in-vehicle actuator used in traveling of the vehicle, a vehicle control device that controls driving of the in-vehicle actuator using an input from the in-vehicle sensor, and a communicator that communicates with the auxiliary vehicle. The vehicle control device implement, upon detecting an abnormality in the in-vehicle sensor, one of the first switching control that controls the driving of the in-vehicle actuator based on an input from the auxiliary sensor, and a second switching control that causes the vehicle to travel using the auxiliary actuator.

6 Claims, 9 Drawing Sheets

(56) References Cited

U.S. PATENT DOCUMENTS

2021/0181760 A1    6/2021  Lee
2021/0327173 A1    10/2021 Park et al.

FOREIGN PATENT DOCUMENTS

| JP | 2019-171971 A | 10/2019 |
|---|---|---|
| KR | 10-2019-0012954 A | 2/2019 |
| WO | 2015028860 A2 | 3/2015 |

* cited by examiner

VEHICLE CONTROL DEVICE, VEHICLE, AND VEHICLE SYSTEM

CROSS-REFERENCE TO RELATED APPLICATION

This application claims priority to Japanese Patent Application No. 2022-063054 filed on Apr. 5, 2022, incorporated herein by reference in its entirety.

BACKGROUND

1. Technical Field

The present disclosure relates to a vehicle control device, a vehicle, and a vehicle system.

2. Description of Related Art

Various proposals have been made for vehicles that can be driven automatically. For example, Japanese Unexamined Patent Publication Application No. 2019-171971 (JP 2019-171971 A) proposes an autonomously driven vehicle focusing on a vehicle that tows a towing vehicle. The towing vehicle described in JP 2019-171971 A switches autonomous driving modes between a state of towing a towed vehicle and a state of not towing a towed vehicle.

SUMMARY

JP 2019-171971 A does not consider a case where a subject vehicle alone cannot execute the autonomous driving or driver assistance when an abnormality occurs in the autonomously driven vehicle.

Therefore, a disclosing person and the like of the present application have considered a vehicle control device, a vehicle, and a vehicle system that can continue the autonomous driving or the driver assistance of the vehicle even when an abnormality, such as a case where the subject vehicle alone cannot continue the autonomous driving or the driver assistance, occurs.

The present disclosure provides a vehicle control device, a vehicle, and a vehicle system that can continue autonomous driving or driver assistance of the vehicle even when an abnormality, such as a case where a subject vehicle alone cannot continue the autonomous driving or the driver assistance, occurs.

A vehicle control device according to a first aspect of the present disclosure is mounted on a vehicle configured to travel using an auxiliary vehicle that includes at least one auxiliary sensor and at least one auxiliary actuator. The vehicle control device includes a processor configured to, upon detecting an abnormality in at least one in-vehicle sensor, control at least one of a first switching control that controls driving of at least one in-vehicle actuator using an input from the auxiliary sensor and a second switching control that causes the vehicle to travel by controlling driving of the auxiliary actuator. The vehicle includes the in-vehicle sensor configured to acquire information of an external environment of the vehicle, the in-vehicle actuator used in traveling of the vehicle, an in-vehicle control unit configured to control the driving of the in-vehicle actuator using the input from the in-vehicle sensor, and a communicator configured to communicate with the auxiliary vehicle.

As above, the vehicle control device according to the first aspect controls at least one of the first switching control that controls driving of the in-vehicle actuator using the input from the auxiliary sensor when the abnormality is detected in the in-vehicle sensor and the second switching control that causes the vehicle to travel by controlling driving of the auxiliary actuator when the abnormality is detected in the in-vehicle actuator. As a result, even when the subject vehicle alone cannot continue autonomous driving or driver assistance due to the abnormality in the in-vehicle sensor or the in-vehicle actuator, it is possible for the vehicle to continue the autonomous driving or the driver assistance using the auxiliary sensor or the auxiliary actuator of the auxiliary vehicle by the first switching control or the second switching control.

In the first aspect, the auxiliary vehicle may include an auxiliary control unit configured to control driving of the auxiliary actuator using the input from the auxiliary sensor. The auxiliary vehicle may control at least one of the first switching control and the second switching control using any one of the in-vehicle control unit and the auxiliary control unit. With this configuration, it is possible to easily control at least one of the first switching control and the second switching control using the in-vehicle control unit provided in the vehicle and the auxiliary control unit provided in the auxiliary vehicle.

In the first aspect, the vehicle may include a plurality of in-vehicle sensors, and the in-vehicle sensors may include a first in-vehicle sensor configured to acquire first information from the external environment and a second in-vehicle sensor configured to acquire second information from the external environment. The auxiliary vehicle may include a plurality of auxiliary sensors. The auxiliary sensors may include a first auxiliary sensor configured to acquire the first information from the external environment and a second auxiliary sensor configured to acquire the second information from the external environment. Upon detecting the abnormality in the first in-vehicle sensor, the processor may control driving of the in-vehicle actuator using the first auxiliary sensor. With this configuration, even when the subject vehicle alone cannot continue the autonomous driving or the driver assistance due to the abnormality in the first in-vehicle sensor, it is possible for the vehicle to continue the autonomous driving or the driver assistance using the auxiliary sensor of the auxiliary vehicle.

In the first aspect, the first in-vehicle sensor and the second in-vehicle sensor may be configured to acquire information of the external environment in front of the vehicle. A detection distance of the first in-vehicle sensor may be longer than a detection distance of the second in-vehicle sensor. The first auxiliary sensor and the second auxiliary sensor may be configured to acquire information of the external environment in front of the auxiliary vehicle. A detection distance of the first auxiliary sensor may be longer than a detection distance of the second auxiliary sensor. With this configuration, at a time of an abnormality in the first in-vehicle sensor with a relatively long detection distance in the vehicle, it is possible to use the first auxiliary sensor with a relatively long detection distance of the auxiliary vehicle. As a result, it is possible for the vehicle to easily continue the autonomous driving or the driver assistance.

In the first aspect, the vehicle may include a connection unit configured to connect the auxiliary vehicle. The vehicle may include a plurality of in-vehicle actuators. The in-vehicle actuators may include a first in-vehicle actuator configured to exhibit a first function for the traveling of the vehicle and a second in-vehicle actuator configured to exhibit a second function for the traveling of the vehicle. The auxiliary vehicle may include a plurality of auxiliary actuators. The auxiliary actuators may include a first auxiliary actuator configured to exhibit a first function for traveling of the auxiliary vehicle and a second auxiliary actuator configured to exhibit a second function for the traveling of the auxiliary vehicle. Upon detecting the abnormality in the first in-vehicle actuator, the processor may cause the auxiliary vehicle to travel using the first auxiliary actuator while the auxiliary vehicle is connected. With this configuration, even when the subject vehicle alone cannot continue the autonomous driving or the driver assistance due to the abnormality in the first in-vehicle actuator, it is possible for the vehicle to continue the autonomous driving or the driver assistance using the first auxiliary actuator of the auxiliary vehicle. Further, since the vehicle and the auxiliary vehicle are connected, it is possible to facilitate the autonomous driving and the driver assistance of the vehicle using the first auxiliary actuator.

In the first aspect, the vehicle may include a wheel and a movement device configured to move the wheel upward. Upon detecting an abnormality in the wheel, the processor may move the wheel upward using the movement device while the auxiliary vehicle is connected. With this configuration, it is possible to separate the wheel with the abnormality from the ground. As a result, it is possible to facilitate the autonomous driving and the driver assistance of the vehicle using the first auxiliary actuator.

A vehicle according to a second aspect of the present disclosure is configured to communicate with an auxiliary vehicle that includes at least one auxiliary sensor and at least one auxiliary actuator. The vehicle includes at least one in-vehicle sensor configured to acquire information of an external environment of the vehicle, at least one in-vehicle actuator used in traveling of the vehicle, a control unit configured to control driving of the in-vehicle actuator using an input from the in-vehicle sensor, and a communicator configured to communicate with the auxiliary vehicle. The control unit is configured to, upon detecting an abnormality in the in-vehicle sensor, implement at least one of a first switching control that controls the driving of the in-vehicle actuator based on an input from the auxiliary sensor, and a second switching control that causes the vehicle to travel using the auxiliary actuator.

As above, the vehicle according to the second aspect controls at least one of the first switching control that controls driving of the in-vehicle actuator using the input of the auxiliary sensor when the abnormality is detected in the in-vehicle sensor and the second switching control that causes the vehicle to travel by controlling driving of the auxiliary actuator when the abnormality is detected in the in-vehicle actuator. As a result, even when the subject vehicle alone cannot continue autonomous driving or driver assistance due to the abnormality in the in-vehicle sensor or the in-vehicle actuator, it is possible for the vehicle to continue the autonomous driving or the driver assistance using the auxiliary sensor or the auxiliary actuator of the auxiliary vehicle by the first switching control or the second switching control.

A vehicle system according to a third aspect of the present disclosure includes an auxiliary vehicle that includes at least one auxiliary sensor and at least one auxiliary actuator, and a vehicle configured to communicate with the auxiliary vehicle. The vehicle includes at least one in-vehicle sensor configured to acquire information of an external environment of the vehicle, at least one in-vehicle actuator used in traveling of the vehicle, a vehicle control device configured to control driving of the in-vehicle actuator using an input from the in-vehicle sensor, and a communicator configured to communicate with the auxiliary vehicle. The vehicle control device is configured to, upon detecting an abnormality in the in-vehicle sensor, implement at least one of a first switching control that controls the driving of the in-vehicle actuator based on an input from the auxiliary sensor, and a second switching control that causes the vehicle to travel using the auxiliary actuator.

As above, the vehicle system according to the third aspect controls at least one of the first switching control that controls driving of the in-vehicle actuator using the input of the auxiliary sensor when the abnormality is detected in the in-vehicle sensor and the second switching control that causes the vehicle to travel by controlling driving of the auxiliary actuator when the abnormality is detected in the in-vehicle actuator. As a result, even when the subject vehicle alone cannot continue autonomous driving or driver assistance due to the abnormality in the in-vehicle sensor or the in-vehicle actuator, it is possible to provide the vehicle system that can continue the autonomous driving or the driver assistance using the auxiliary sensor or the auxiliary actuator of the auxiliary vehicle by the first switching control or the second switching control.

With each aspect of the present disclosure, it is possible for a vehicle to continue autonomous driving or driver assistance even when an abnormality, such as a case where a subject vehicle alone cannot continue the autonomous driving or the driver assistance, occurs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle system 1 and a control device 11 according to the present embodiment will be described with reference to FIGS. 1 to 9. Among configurations illustrated in FIGS. 1 to 9, the same or substantially the same configurations are denoted by the same reference signs, and redundant descriptions are omitted.

Figure 1:
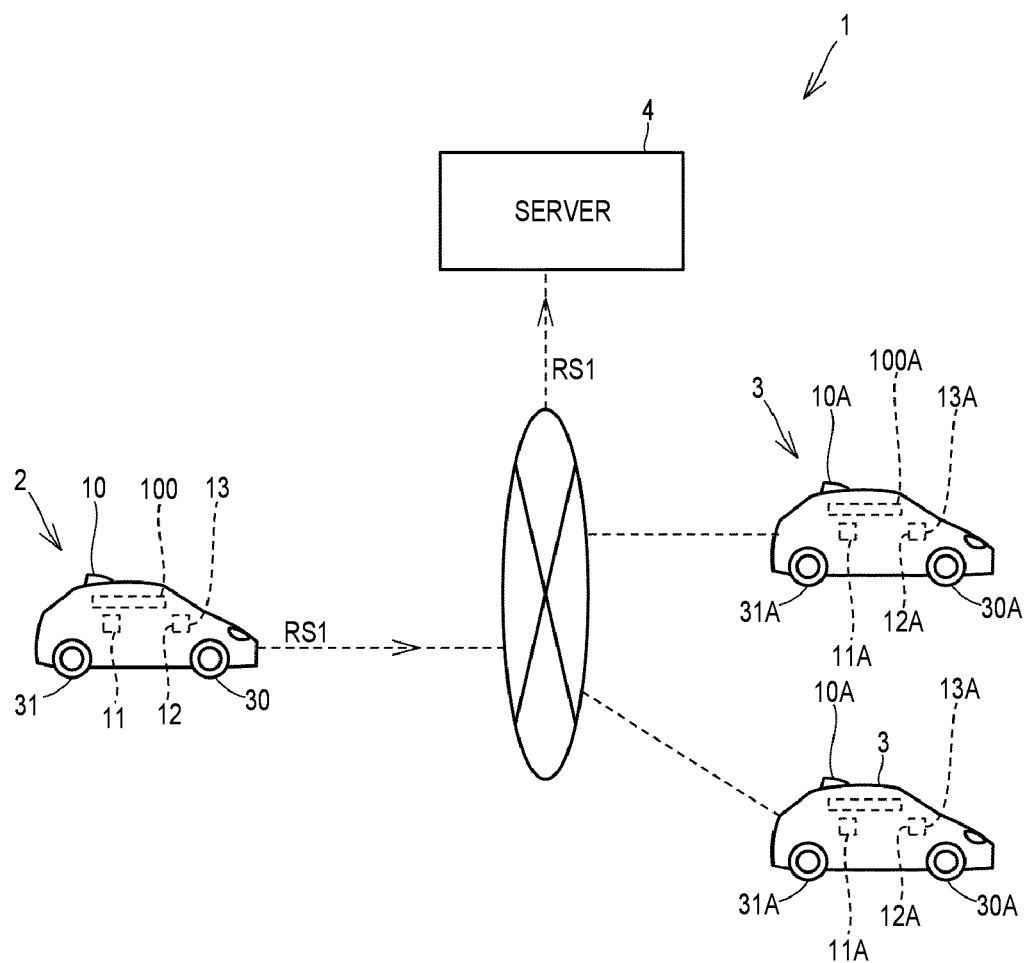
FIG. 1 is a diagram illustrating a configuration of a vehicle system according to one embodiment.

FIG. 1 is a schematic diagram schematically illustrating the vehicle system 1 according to the present embodiment. The vehicle system 1 includes a vehicle 2 and an auxiliary vehicle 3. The vehicle 2 is a vehicle capable of executing autonomous driving or driver assistance traveling.

The vehicle 2 includes a driver assistance system 100, a communication device 10, a control device 11, and a notification device 12. The vehicle 2 includes a pair of front wheels 30 and a pair of rear wheels 31. The vehicle 2 can communicate with the auxiliary vehicle 3 and a server 4 via the communication device 10. The notification device 12 notifying a driver or the like of various pieces of information on the vehicle 2. The notification device 12 includes, for example, a display unit 13 that displays various pieces of information. The communication device 10 and the control device 11 are examples of a "communicator" and a "vehicle control device" of the present disclosure, respectively. Further, the front wheels 30 and the rear wheels 31 are examples of "wheels" in the present disclosure.

The auxiliary vehicle 3 assists traveling of the vehicle 2 when a failure occurs in the vehicle 2. In the example illustrated in FIG. 1, a plurality of auxiliary vehicles 3 is arranged.

The auxiliary vehicle 3 includes a driver assistance system 100A, a communication device 10A, a control device 11A, and a notification device 12A. The auxiliary vehicle 3 includes a pair of front wheels 30A and a pair of rear wheels 31A. The notification device 12A includes a display unit 13A that displays various pieces of information. The auxiliary vehicle 3 can communicate with the vehicle 2 and a server 4 via the communication device 10A.

The server 4 manages schedules of the auxiliary vehicles 3. Here, in the vehicle 2, there is a case where an abnormality occurs in a sensor or the like mounted on the vehicle 2, and the autonomous driving or the driver assistance traveling cannot be executed. At this time, a request signal RS1 is transmitted from the vehicle 2 to the server 4 by an operation of the driver. Upon receiving the request signal RS1, the server 4 directs the auxiliary vehicle 3 to the vehicle 2 based on, for example, position information of the vehicle 2 included in the request signal RS1.

Upon arriving at a place in which the vehicle 2 is positioned, the auxiliary vehicle 3 is connected with the vehicle 2 so that the vehicle 2 becomes a state of being capable of executing autonomous driving traveling or driver assistance traveling, and causes the vehicle 2 to travel.

The auxiliary vehicle 3 includes a driver assistance system 100A in the same manner as the vehicle 2 and includes a configuration similar to that of the vehicle 2. Therefore, a configuration of the vehicle 2 is mainly described.

Figure 2:
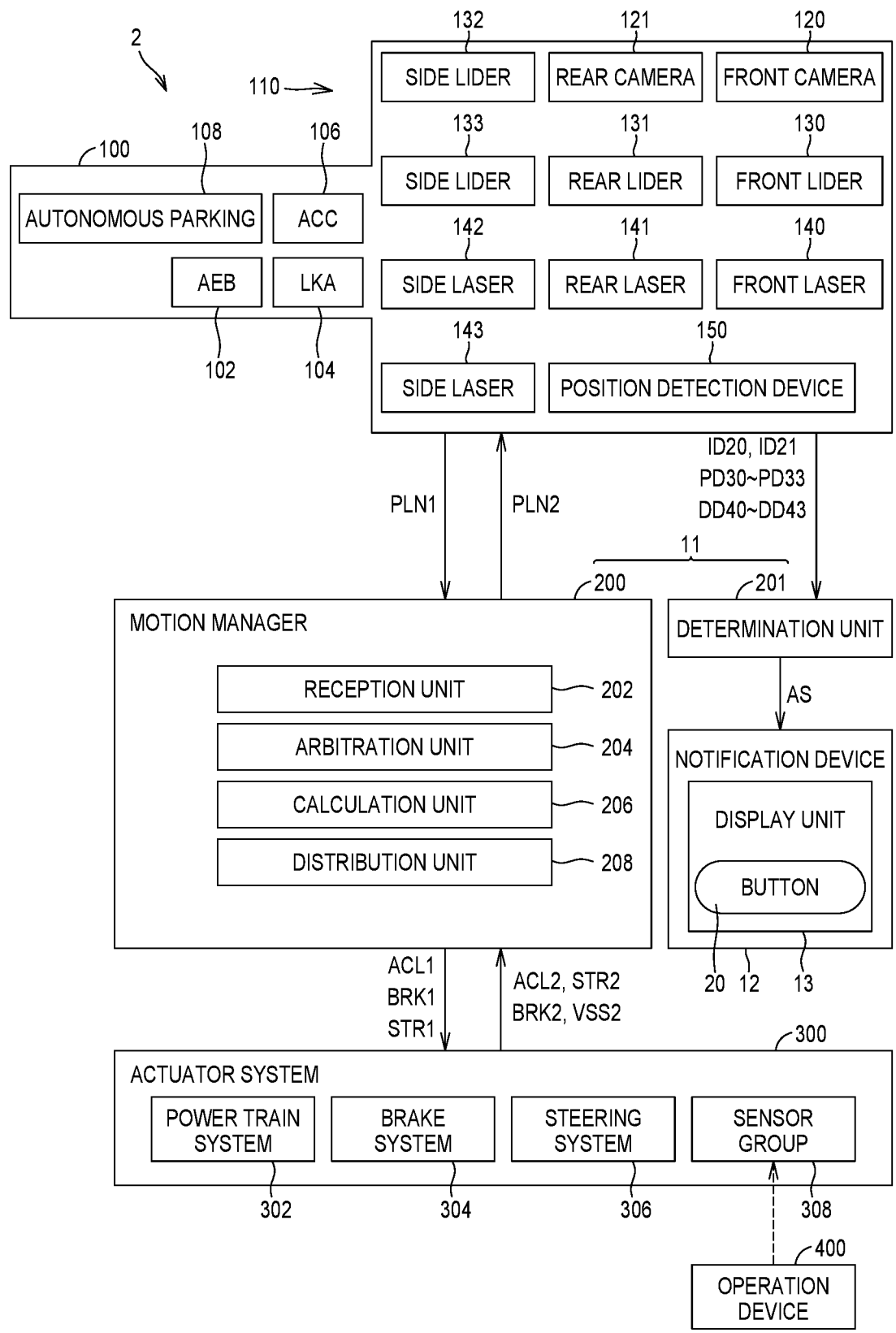
FIG. 2 is a diagram illustrating a configuration of a vehicle according to one embodiment.

FIG. 2 is a block diagram schematically illustrating the configuration of the vehicle 2. The vehicle 2 includes the driver assistance system 100, the control device 11, an actuator system 300, and an operation device 400. The actuator system 300 is an example of an "in-vehicle actuator" of the present disclosure.

By executing embedded applications, the driver assistance system 100 is configured to implement various functions for assisting driving of the vehicle 2, including at least one of steering control, driving control, and braking control of the vehicle 2. The driver assistance system 100 includes a plurality of applications. Examples of the applications embedded in the driver assistance system 100 include an application that realizes a function of an autonomous driving system (AD), an application that realizes a function of an autonomous parking system, and an application (hereinafter, referred to as an ADAS application) that realizes a function of an advanced driver assistance system (ADAS).

Examples of the ADAS application include at least one of an application that realizes a function of follow-up traveling (an adaptive cruise control (ACC), or the like), an application that realizes a function of an auto speed limiter (ASL), an application that realizes a function of a lane keeping assistance (LKA), an application that realizes a function of a lane tracing assistance (LTA) or the like, an application that realizes a function of a collision damage mitigation braking (an autonomous emergency braking (AEB), an application that realizes a function of a pre-crash safety (PCS) or the like, an application that realizes a function of a lane departure warning (LDW), and an application that realizes a function of a lane departure alert (LDA) or the like).

In the driver assistance system 100 illustrated in FIG. 2, for example, a case where an AEB 102, an LKA 104, an ACC 106, and an autonomous parking 108 are included as applications is illustrated. The driver assistance system 100 includes various applications and a sensor group 110. The sensor group 110 is an example of an "in-vehicle sensor" of the present disclosure.

Each application included in the driver assistance system 100 outputs a request for a kinematic plan to a motion manager 200 based on, for example, information of a vehicle surrounding situation acquired (input) from the sensor group 110 or a driver's assistance request. The motion manager 200 controls driving of the actuator system 300 using inputs from the sensor group 110. Here, the kinematic plan includes, for example, longitudinal acceleration/deceleration of the vehicle 2 and a target curvature of a traveling route of the vehicle 2.

The sensor group 110 acquires various pieces of information on the external environment of the vehicle 2. The sensor group 110 includes a front camera 120, a rear camera 121, a front LiDAR 130, a rear LiDAR 131, a side LiDAR 132, a side LiDAR 133, a front laser 140, a rear laser 141, a side laser 142, a side laser 143, and a position detection device 150. The front camera 120 and the front LiDAR 130 are examples of a "first in-vehicle sensor" and a "second in-vehicle sensor" of the present disclosure, respectively.

The front camera 120 acquires an image in front of the vehicle 2. The rear camera 121 acquires an image in the rear of the vehicle 2. The front camera 120 acquires images of, for example, a white line or a sign, and the surrounding environment. The front camera 120 transmits captured image data ID20 to each application of the driver assistance system 100. The rear camera 121 also transmits captured image data ID21 to each application of the driver assistance system 100.

The LiDAR is a distance measuring device that beams a laser beam (light, such as infrared rays) in a pulse shape and acquires information on a distance and a positional relationship for measuring a distance by a time until it is reflected by an object and returns. The front LiDAR 130 acquires information on the front of the vehicle 2. The rear LiDAR 131 acquires information on the rear of the vehicle 2. Each of the side LiDAR 132 and the side LiDAR 133 acquires information on the sides of the vehicle 2. The front LiDAR 130 transmits acquired point group data PD30 to each application of the driver assistance system 100. The rear LiDAR 131, the side LiDAR 132, and the side LiDAR 133 transmit pieces of point group data PD31, PD32, PD33 to each application, respectively.

Laser is a device that emits radio waves with a frequency of, for example, GHz to 300 GHz, detects the reflected waves, and detects a distance to an object. The front laser 140 measures a distance to, for example, another vehicle positioned in front of the vehicle 2. The rear laser 141 measures a distance to, for example, a vehicle positioned in the rear of the vehicle 2. Each of the side laser 142 and the side laser 143 measures a distance to, for example, another vehicle positioned on a side of the vehicle 2.

The front laser 140, the rear laser 141, the side laser 142, and the side laser 143 transmit acquired pieces of distance data DD40, DD41, DD42, DD43 to each application of the driver assistance system 100, respectively.

Figure 3:
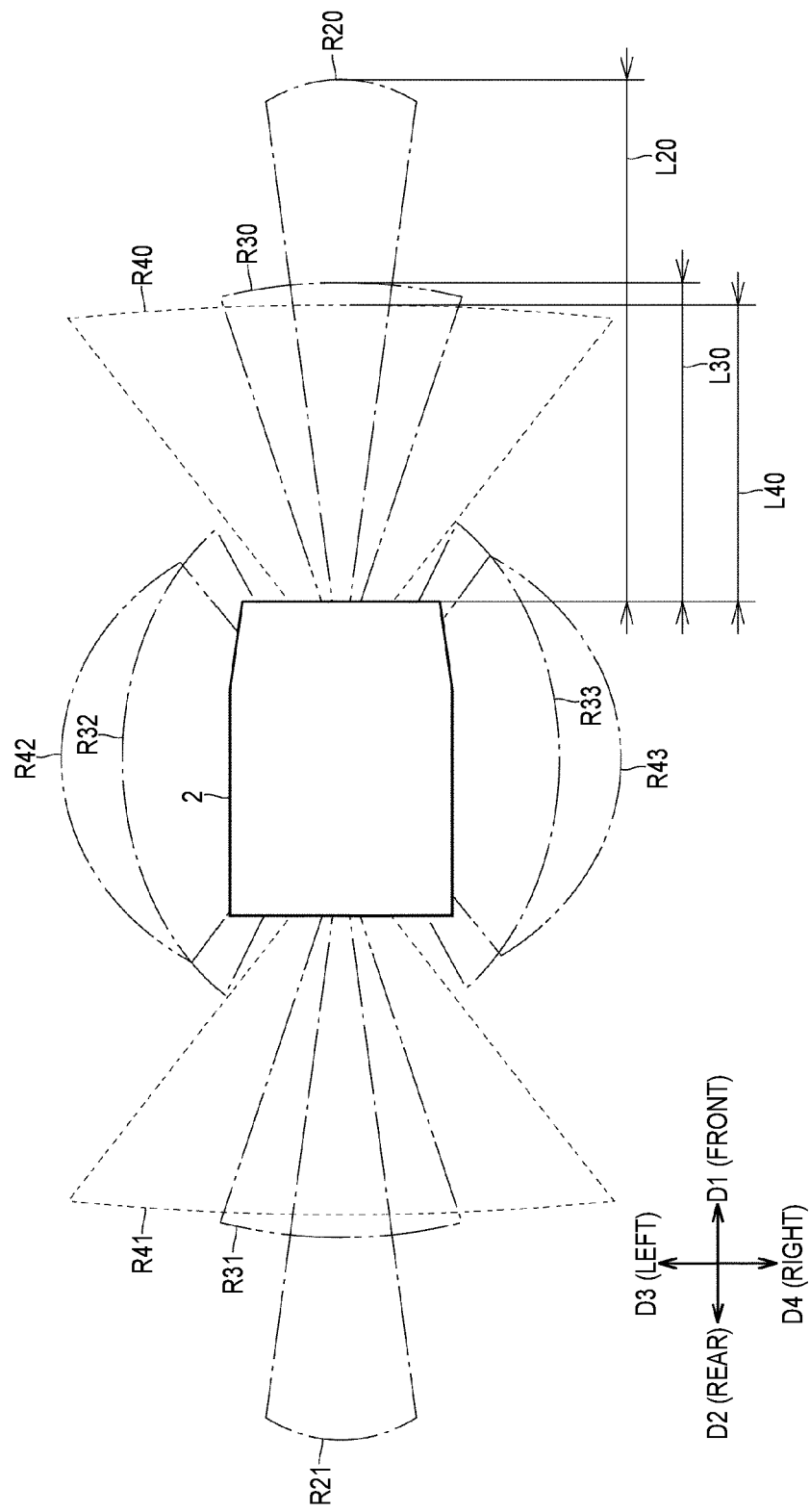
FIG. 3 is a diagram illustrating a detection area of each sensor of the vehicle according to one embodiment.

FIG. 3 is a plan view schematically illustrating a detection range of each sensor of the sensor group 110. A detection area R20 indicates a detection area of the front camera 120. A detection area R21 indicates a detection area of the rear camera 121.

Detection areas R30, R31, R32, R33 indicate detection areas of the front LiDAR 130, the rear LiDAR 131, the side LiDAR 132, and the side LiDAR 133, respectively.

Detection areas R40, R41, R42, R43 indicate detection areas of the front laser 140, the rear laser 141, the side laser 142, and the side laser 143, respectively.

Here, a detection distance L20 indicates a detection distance of the front camera 120 in the front direction of the vehicle 2. Further, a detection distance L30 indicates a detection distance of the front LiDAR 130 in the front direction of the vehicle 2. In the present embodiment, the detection distance L20 is longer than the detection distance L30.

Figure 4:
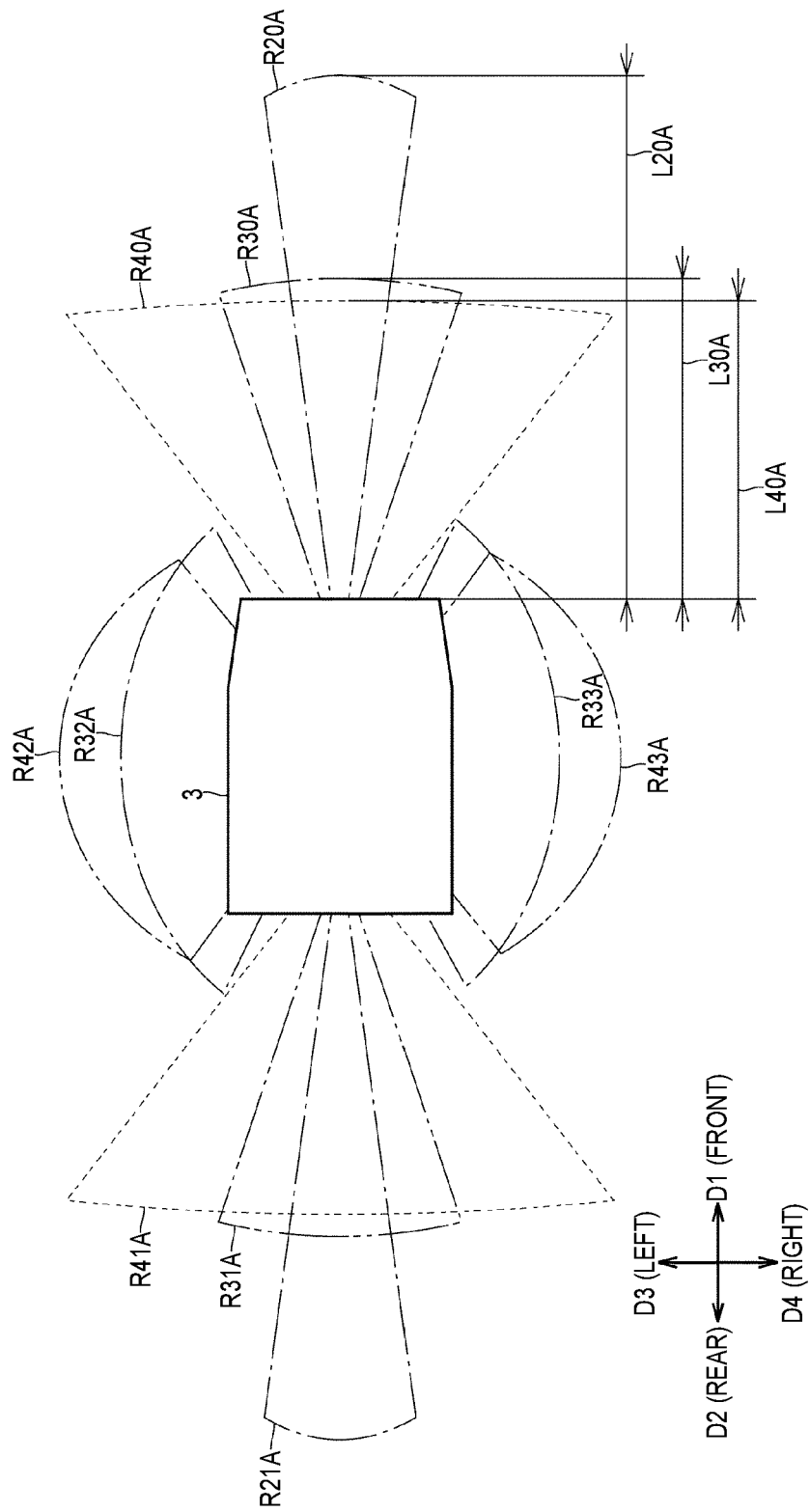
FIG. 4 is a diagram illustrating a detection area of each sensor of an auxiliary vehicle according to one embodiment.

FIG. 4 is a plan view schematically illustrating, for example, a detection range of each sensor of the sensor group 110A. A detection area R20A indicates a detection area of a front camera 120A. A detection area R21A indicates a detection area of a rear camera 121A.

Detection areas R30A, R31A, R32A, R33A indicate detection areas of a front LiDAR 130A, a rear LiDAR 131A, a side LiDAR 132A, and the side LiDAR 133A, respectively.

Detection areas R40A, R41A, R42A, R43A indicate detection areas of a front laser 140A, a rear laser 141A, a side laser 142A, and a side laser 143A, respectively.

Here, a detection distance L20A indicates a detection distance of the front camera 120A in the front direction of the auxiliary vehicle 3. Further, a detection distance L30A indicates a detection distance of the front LiDAR 130A in the front direction of the auxiliary vehicle 3. In the present embodiment, the detection distance L20A is longer than the detection distance L30A.

In FIG. 2, the position detection device 150 may be composed of, for example, a Global Positioning System (GPS) that detects the position of the vehicle 2 using information received from a plurality of satellites orbiting the earth.

Each application, such as the AEB 102 provided in the driver assistance system 100, acquires information input from at least one sensor of the sensor group 110. Each application can recognize another vehicle, an obstacle, or a person around the vehicle 2, based on, for example, information on the outside of the vehicle 2 acquired by the sensor group 110. Further, each application acquires a driver assistance request via a user interface (not shown), such as a switch.

The operation device 400 includes, for example, an operation member, such as a shift lever or a brake pedal, used for changing the shift range, which is operated by a user who is the driver.

The actuator system 300 includes a plurality of types of actuator systems. The actuator system 300 includes, for example, a power train system 302, a brake system 304, a steering system 306, and a sensor group 308. The brake system 304 is an example of a "first in-vehicle actuator" of the present disclosure. Further, each of the power train system 302, the steering system 306, and the sensor group 308 is an example of a "second in-vehicle actuator" of the present disclosure.

The power train system 302 includes a power train actuator capable of generating a drive force to drive wheels of the vehicle 2 and a power train electronic control unit (ECU) that controls an operation of the power train actuator.

The power train actuator includes, for example, an internal combustion engine, a transmission, and a drive source. The drive source includes a motor generator, a power accumulation device, and a power control unit (PCU). The PCU includes an inverter and a converter.

The power train ECU controls driving of each power train actuator. The power train ECU includes, for example, an internal combustion engine ECU, a PCU ECU, and a power accumulation device ECU.

Figure 8:
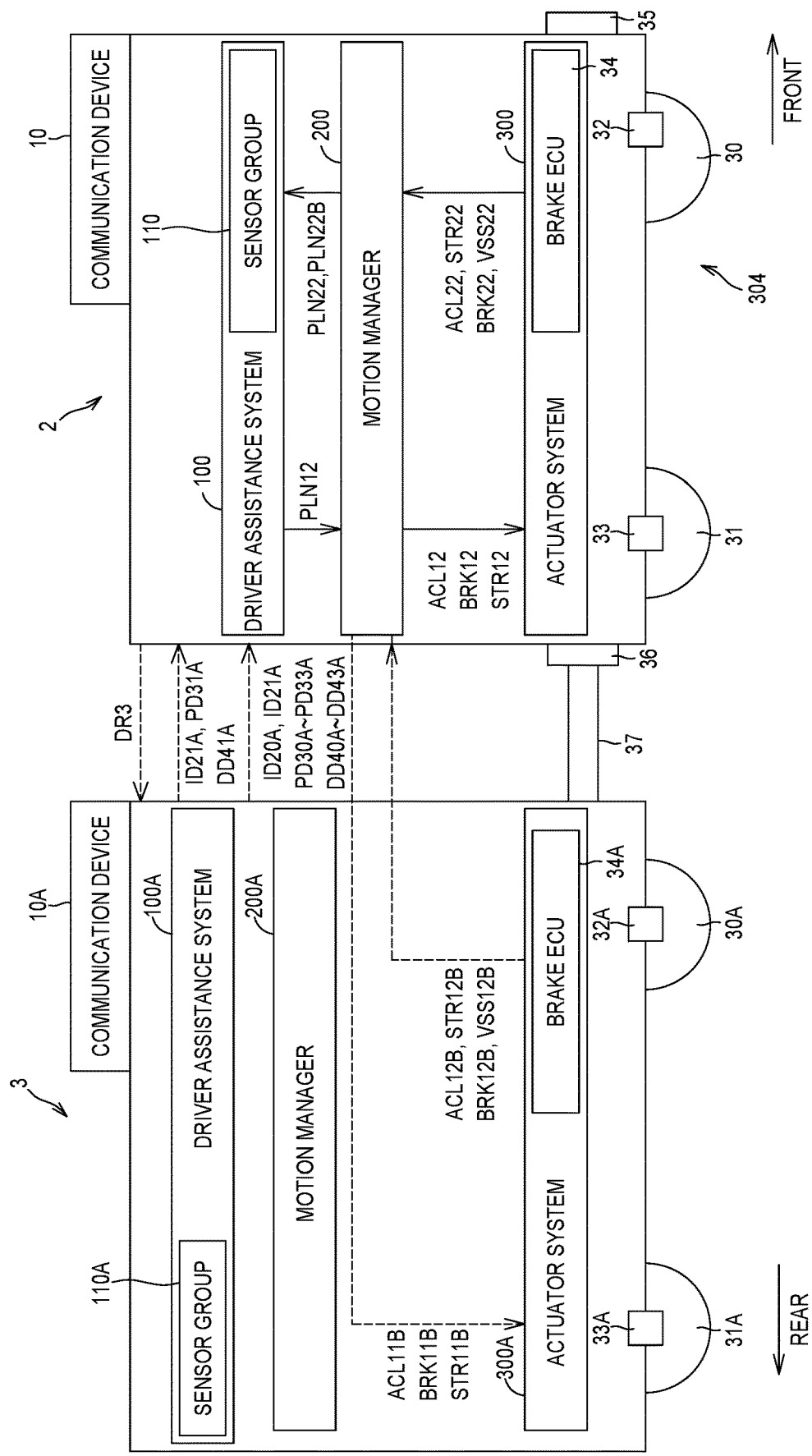
FIG. 8 is a diagram illustrating a state in which the vehicle travels using a hydraulic pressure brake of the auxiliary vehicle according to one embodiment.

The brake system 304 includes a hydraulic brake 32 (see FIG. 8), a hydraulic brake 33 (see FIG. 8), and a brake ECU 34 (see FIG. 8). The hydraulic brake 32 is provided on the front wheel 30. The hydraulic brake 33 is provided on the rear wheel 31. The brake ECU 34 controls driving of the hydraulic brake 32 and the hydraulic brake 33.

The steering system 306 includes, for example, a steering device capable of changing a steering angle of a steering wheel (for example, the front wheel 30) of the vehicle 2, and an ECU (neither shown) that controls an operation of the steering device. The steering system includes, for example, a steering wheel that changes the steering angle according to an operation amount and an electric power steering (EPS) capable of adjusting the steering angle by an actuator independently of the operation of the steering wheel. The ECU, which controls the operation of the steering system, controls an operation of the EPS actuator. The sensor group 308 includes a tire pressure sensor 45 (see FIG. 9), a tire pressure sensor 46 (see FIG. 9), a longitudinal G sensor (not shown) that detects vehicle body acceleration in the longitudinal direction of the vehicle 2, a lateral G sensor (not shown) that detects the vehicle body acceleration in the lateral direction of the vehicle 2, and a wheel velocity sensor (not shown) that detects wheel velocity.

As illustrated in FIG. 2, the control device 11 includes the motion manager 200 and a determination unit 201. The determination unit 201 acquires various pieces of information detected by each sensor of the sensor group 110, and detects an abnormality occurring in each sensor based on the acquired information. The motion manager 200 includes a reception unit 202, an arbitration unit 204, a calculation unit 206, and a distribution unit 208. An operation of each member when the vehicle 2 configured as above travels is described. The motion manager 200 is an example of an "in-vehicle control unit" of the present disclosure.

The reception unit 202 receives a request signal PLN 1 from an application of the driver assistance system 100. Examples of the request signals PLN 1 include a request signal PLN 1-2 of the ACC 106, a request signal PLN 1-6 of the AEB 102, and a request signal PLN 1-11 of the LKA 104. The request signal PLN 1-2 includes, for example, a request value (a kinematic plan) indicating the target acceleration of the vehicle 2. The request signal PLN 1-6 includes, for example, a request value (a kinematic plan) indicating the target acceleration of the vehicle 2 and a stop keeping request (a kinematic plan). The request signal PLN 1-11 includes, for example, information indicating a request value (a kinematic plan) indicating a target curvature of the traveling route the vehicle 2.

The arbitration unit 204 arbitrates various request values (kinematic plans) included in the request signal PLN 1. For example, the arbitration unit 204 arbitrates the target acceleration of the vehicle 2 included in the request signal PLN 1-2 and the request signals PLN 1-6. An example of an arbitration process is to select one request value from a plurality of request values (the kinematic plans) based on a predetermined selection criterion. Further, another example of the arbitration process is setting a new request value based on the request values. The arbitration unit 204 may further add predetermined information received from the actuator system 300 to arbitrate the requests of the request values.

The calculation unit 206 calculates a motion request value required for vehicle 2 based on, for example, the arbitrated request value. When the arbitrated request value is positive acceleration of the vehicle 2, the motion request value may be, for example, a drive force and drive torque.

The distribution unit 208 distributes (transmits) the motion request value calculated by the calculation unit 206 to at least one actuator system of the actuator systems 300. For example, when the arbitrated request value is positive acceleration of the vehicle 2, the distribution unit 208 distributes the motion request to only the power train system 302. In the example illustrated in FIG. 2, the distribution unit 208 transmits the request signals ACL 1, BRK 1, STR 1 to the actuator system 300.

The request signal ACL 1 includes, for example, information on the request value of the drive torque or the drive force, or information (including information on a target shift range and a recognition shift range described below) on a requested shift range.

The request signal BRK 1 includes, for example, information on the request value of brake torque and information on a timing of implementing braking (whether implementation is executed immediately).

The request signal STR 1 includes, for example, a target (request) steering angle, information on whether the target steering angle is valid, and information on upper and lower limit torque of assistance torque of an operation of the steering wheel.

The power train system 302, the brake system 304, and the steering system 306 are driven to meet the received motion request value. Then, the actuator system 300 transmits response signals ACL 2, BRK 2, STR 2, VSS 2 to the motion manager 200 indicating a state of each actuator.

The response signal ACL 2 is transmitted from the power train system 302 to the motion manager 200. The response signal ACL 2 indicates a state of the power train system 302. The response signal ACL 2 includes, for example, information on an operation of an accelerator pedal, information on actual drive torque or a drive force of the power train system 302, actual shift range information (including information on a current shift range described below), information on upper and lower limits of the drive torque, information on upper and lower limits of the drive force, or information on reliability of the power train system 302.

The response signal BRK 2 is transmitted from the brake system 304 and indicates a state of the brake system 304. The response signal BRK 2 includes, for example, information on the operation of the brake pedal, information on the brake torque requested by the driver, information on the request value of the brake torque after arbitration, information on the actual brake torque after the arbitration, or information on reliability of the brake system 304.

The response signal STR 2 is transmitted from the steering system 306 and indicates a state of the steering system 306. The steering system 306 includes, for example, information on the reliability of the steering system 306, information on whether the driver is gripping the steering wheel, information on torque for operating the steering wheel, or information on a rotation angle of the steering wheel.

The response signal VSS 2 is transmitted from the sensor group 308. The response signal VSS 2 includes, for example, a detection value of the longitudinal G sensor, a detection value of the lateral G sensor, a detection value of the wheel velocity sensor of each wheel, a detection value of a yaw rate sensor, and information on the reliability of each sensor.

The motion manager 200 transmits the response signal PLN 2 including the various pieces of information received from the actuator system 300 to the driver assistance system 100.

Each application of the driver assistance system 100 updates the request signal PLN 1 based on the received response signal PLN 2.

In this manner, the vehicle 2 travels based on traveling assistance from each application of the driver assistance system 100.

The determination unit 201 acquires information acquired by each sensor of the sensor group 110 during activation of the vehicle 2. The determination unit 201 acquires image data ID20 and image data ID21 from the front camera 120 and the rear camera 121, respectively. The determination unit 201 acquires the point group data PD30, PD31, PD32, PD33 from the front LiDAR 130, the rear LiDAR 131, the side LiDAR 132, the side LiDAR 133, respectively. The determination unit 201 acquires the distance data DD40, DD41, DD42, DD43 from the front laser 140, the rear laser 141, the side laser 142, the side laser 143, respectively.

The determination unit 201 determines whether an abnormality has occurred in each sensor based on various pieces of data input from each sensor.

When there is no data input from any sensor of the sensor group 110 for a predetermined period, the determination unit 201 determines that an abnormality has occurred in the sensor. Further, based on each input data, the determination unit 201 determines whether there is an abnormality in the sensor that has output the data. The determination unit 201 may determine whether there is an abnormality in each sensor by comparing data input from each sensor.

For example, when the image data ID20 input from the front camera 120 is not input within the predetermined period, the determination unit 201 may be configured to determine that an abnormality has occurred in the front camera 120.

For example, when a missing area of the image data ID20 is equal to or greater than a predetermined range, the determination unit 201 may be configured to determine that an abnormality has occurred in the front camera 120. In this case, for example, it is conceivable that a foreign object has adhered to a lens of the front camera 120 or that an optical element of the front camera 120 has been damaged.

For example, the determination unit 201 determines whether there is an abnormality in the front camera 120, the front LiDAR 130, and the front laser 140 based on the distance to a front vehicle that is calculated based on the image data ID20, the distance to the front vehicle that is calculated based on the point group data PD30, and the distance to the front vehicle that is calculated based on the distance data DD40.

When an abnormality has occurred in any sensor of the sensor group 110, the determination unit 201 transmits an abnormality signal AS to the motion manager 200 and the notification device 12. The abnormality signal AS includes information specifying in which sensor in the sensor group 110 the abnormality has occurred.

When the abnormality signal AS is received, the motion manager 200 stops each of communication with the driver assistance system 100 and communication with the actuator system 300 within a predetermined period. As a result, it is possible for the vehicle 2 to execute normal traveling operated by the driver, but is not possible to execute the autonomous driving traveling and the traveling assistance traveling based on the driver assistance system 100.

When the abnormality signal AS is received, the notification device 12 notifies that it is impossible to execute the autonomous driving traveling and the traveling assistance traveling after the predetermined period elapses. Further, when the auxiliary vehicle 3 is executing the autonomous driving traveling or the driver assistance traveling using the driver assistance system 100, the notification device 12 notifies that driving control is returned to the driver.

The notification device 12 displays an auxiliary request button 20 on the display unit 13 after the predetermined period elapses since the abnormality signal AS has been received.

When the driver presses the auxiliary request button 20, the request signal RS1 is transmitted from the vehicle 2 to the server 4 in FIG. 1. The request signal RS1 includes information specifying the vehicle 2, position information of the vehicle 2, and information on the abnormality that has occurred in the vehicle 2. The abnormality information includes information specifying a sensor or an actuator in which the abnormality has occurred in the vehicle 2.

Figure 5:
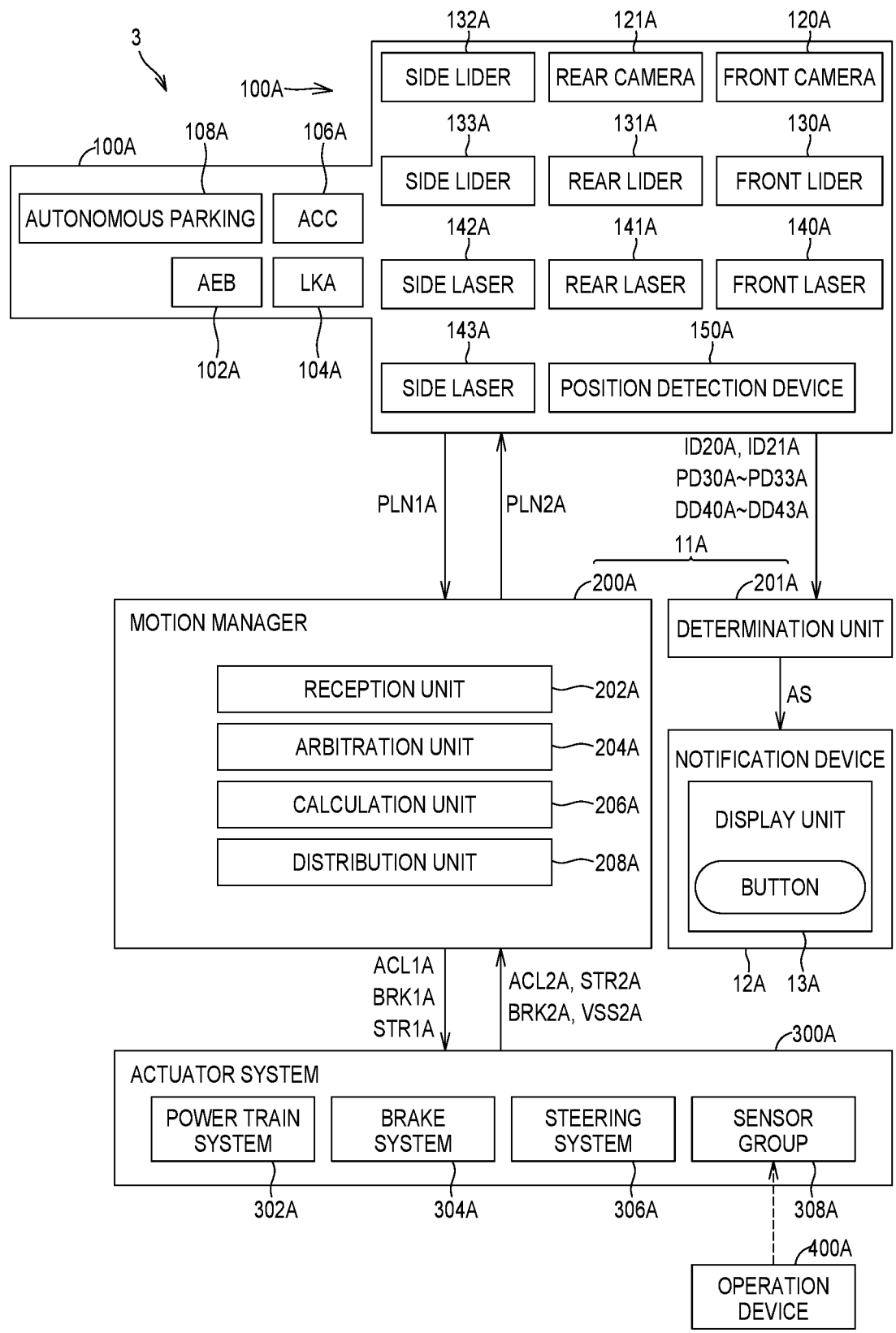
FIG. 5 is a diagram illustrating a configuration of the auxiliary vehicle according to one embodiment.

FIG. 5 is a block diagram schematically illustrating the configuration of the auxiliary vehicle 3. Each configuration of the auxiliary vehicle 3 is substantially the same as that of the vehicle 2. Therefore, the configuration corresponding to that of the vehicle 2 is given an approximate reference sign (for example, "A" is added to the reference sign of the vehicle 2), and the description thereof is omitted.

The auxiliary vehicle 3 includes the driver assistance system 100A, the sensor group 110A, the motion manager 200A, a determination unit 201A, the actuator system 300A, and an operation device 400A. The motion manager 200A and the actuator system 300A are examples of an "auxiliary control unit" and an "auxiliary actuator" of the present disclosure, respectively. Further, the sensor group 110A is an example of an "auxiliary sensor" of the present disclosure.

The driver assistance system 100A includes an AEB 102A, an LKA 104A, an ACC 106A, and an autonomous parking 108A.

The sensor group 110A acquires various pieces of information on the external environment of the auxiliary vehicle 3. The sensor group 110A includes the front camera 120A, the rear camera 121A, the front LiDAR 130A, the rear LiDAR 131A, the side LiDAR 132A, the side LiDAR 133A, the front laser 140A, the rear laser 141A, the side laser 142A, the side laser 143A, and a position detection device 150A. The motion manager 200A includes a reception unit 202A, an arbitration unit 204A, a calculation unit 206A, and a distribution unit 208A. The actuator system 300A includes a power train system 302A, a brake system 304A, a steering system 306A, and a sensor group 308A. The front camera 120A and the front LiDAR 130A are examples of a "first auxiliary sensor" and a "second auxiliary sensor" of the present disclosure, respectively. Further, the brake system 304A is an example of a "first auxiliary actuator" of the present disclosure. Further, each of the power train system 302A, the steering system 306A, and the sensor group 308A is an example of a "second auxiliary actuator" of the present disclosure.

Then, when the auxiliary vehicle 3 travels based on each application of the driver assistance system 100A, the driver assistance system 100A transmits the request signal PLN 1A to the motion manager 200A.

The motion manager 200A transmits request signals ACL 1A, BRK 1A, STR 1A to the actuator system 300A. The actuator system 300A transmits response signals ACL 2A, BRK 2A, STR 2A, and VSS 2A to the motion manager 200A. The motion manager 200A transmits a response signal PLN 2A to the driver assistance system 100A.

Control when there is Abnormality in a Sensor

In the vehicle system 1 configured as above, an abnormality has occurred in the front laser 140 of the vehicle 2. Upon detecting an abnormality in the front laser 140, the determination unit 201 (see FIG. 2) transmits the abnormality signal AS to the notification device 12. The notification device 12 displays the auxiliary request button 20 (see FIG. 2) on the display unit 13 after the predetermined period elapses since the abnormality signal AS has been received. When the driver presses the auxiliary request button 20, the request signal RS1 (see FIG. 1) is transmitted to the server 4. Upon receiving the request signal RS1, the server 4 directs the auxiliary vehicle 3 to the vehicle 2 based on, for example, the position information of the vehicle 2 included in the request signal RS1.

Upon arriving at the place in which the vehicle 2 is positioned, the auxiliary vehicle 3 cooperates with the vehicle 2 so that the vehicle 2 becomes a state of being capable of executing the autonomous driving traveling or the driver assistance traveling.

Figure 6:
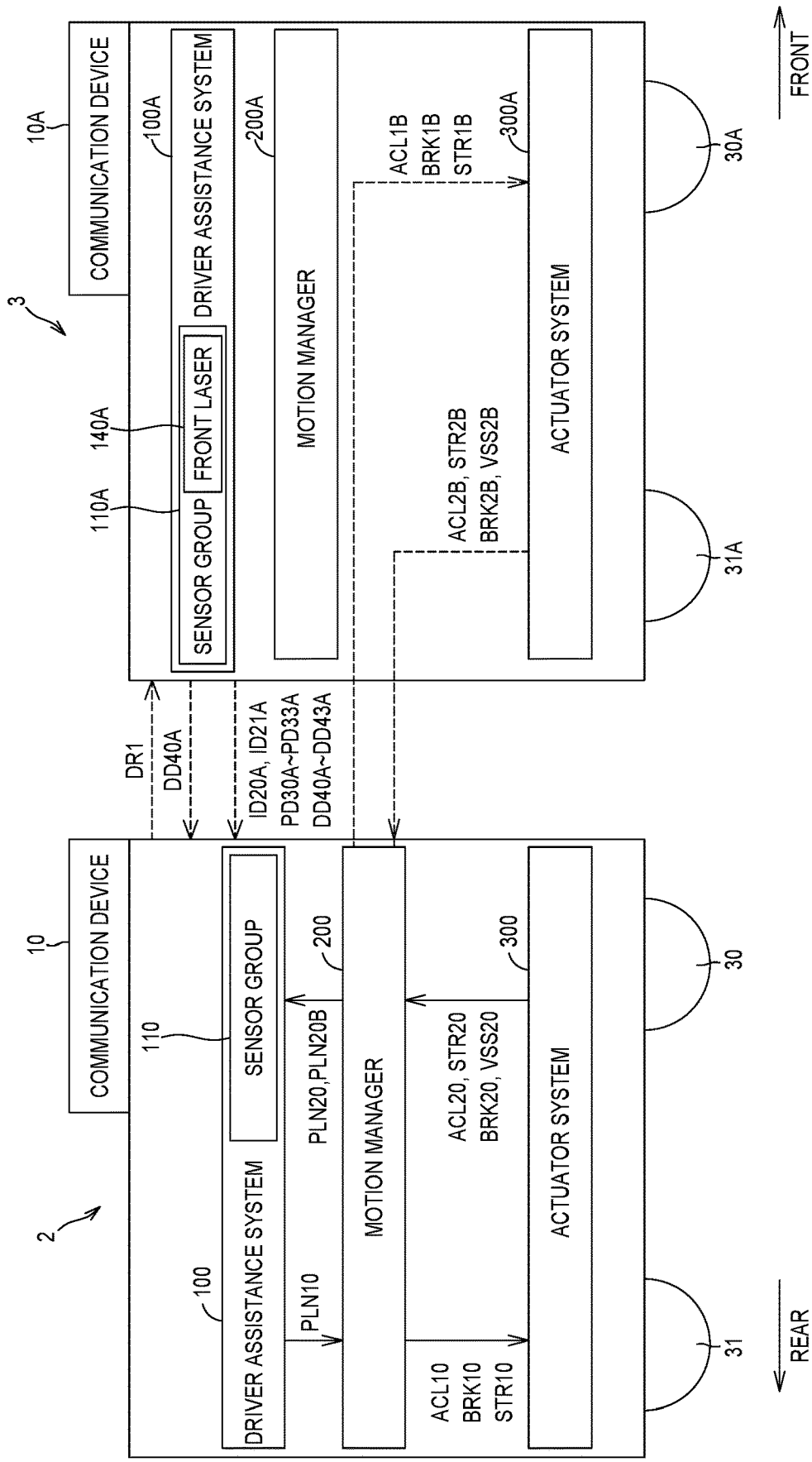
FIG. 6 is a diagram illustrating a state in which the vehicle travels using a front laser of the auxiliary vehicle according to one embodiment.

FIG. 6 is a diagram illustrating a state in which the vehicle 2 becomes the state of being capable of executing the autonomous driving traveling or the driver assistance traveling by cooperating with the auxiliary vehicle 3. The auxiliary vehicle 3 establishes communication with the vehicle 2 before cooperating with the vehicle 2. When the vehicle 2 establishes communication with the auxiliary vehicle 3, a communication stop state between the motion manager 200 and the driver assistance system 100 is released.

As illustrated in FIG. 6, when the vehicle 2 cooperates with the auxiliary vehicle 3 and executes the autonomous driving traveling or the driver assistance traveling, the auxiliary vehicle 3 travels in front of the vehicle 2.

In the driver assistance system 100, when an abnormality has occurred in a sensor that acquires information on a front area of the vehicle 2, the vehicle 2 transmits a traveling request DR1 for traveling in front of the vehicle 2 to the auxiliary vehicle 3. On the other hand, when an abnormality has occurred in a sensor that acquires information on a rear area of the vehicle 2, the vehicle 2 transmits a traveling request DR2 (see FIG. 7) to the auxiliary vehicle 3.

Upon receiving the traveling request DR1 from the vehicle 2, the auxiliary vehicle 3 is controlled such that it travels in front of the vehicle 2. The traveling request DR1 includes information specifying a sensor or an actuator in which the abnormality has occurred in the vehicle 2. In the present embodiment, the traveling request DR1 includes information indicating that an abnormality has occurred in the front laser 140.

The auxiliary vehicle 3 transmits, to the vehicle 2, data of a sensor that exhibits the same function as the sensor specified in the traveling request DR1. In the present embodiment, the auxiliary vehicle 3 transmits distance data DD40A of the front laser 140A to the vehicle 2. Therefore, the communication device 10 of the vehicle 2 acquires the distance data DD40A from the front laser 140A corresponding to a failed front laser 140 among the sensors of the sensor group 110A.

Then, the communication device 10 of the vehicle 2 transmits the acquired distance data DD40A to each application of the driver assistance system 100. Each application of the driver assistance system 100 calculates a request value (a request signal PLN 10) to the motion manager 200 based on the acquired distance data DD40A and the various pieces of data from the sensor group 110. Specifically, each application of the driver assistance system 100 calculates the above request value based on the distance data DD40A, the pieces of image data ID20, ID21, the pieces of point group data PD30 to PD33, and the pieces of distance data DD40 to DD42.

Then, the driver assistance system 100 inputs the request signal PLN 10 to the motion manager 200. The motion manager 200 calculates a request signal ACL 10, a request signal BRK 10, and a request signal STR 10 based on the input request signal PLN 10, and inputs each request signal to the actuator system 300. Then, the actuator system 300 transmits response signals ACL 20, BRK 20, STR 20, VSS 20 to the motion manager 200. The motion manager 200 transmits a response signal PLN 20 to the driver assistance system 100 based on the received response signals.

In this manner, the vehicle 2 can execute the autonomous driving traveling or the driver assistance traveling using the data (DD40A) acquired from the auxiliary vehicle 3.

Each application of the driver assistance system 100 may calculate the request value to the motion manager 200 after correcting the acquired distance data DD40A. For example, each application may calculate the request value based on the distance between the auxiliary vehicle 3 and the vehicle 2 using correction data obtained by correcting the distance data DD40A.

As such, in the vehicle system 1 according to the present embodiment, the vehicle 2 can implement the autonomous driving traveling or the driver assistance traveling using the input from the front camera 120A of the auxiliary vehicle 3 when an abnormality has occurred in the front camera 120, which is a part of the sensor group 110.

Further, in the present embodiment, the vehicle 2 controls driving of the auxiliary vehicle 3. For example, the vehicle 2 receives pieces of image data ID20A, ID21A, pieces of point group data PD30A to PD33A, and pieces of distance data DD40A to DD43A from the auxiliary vehicle 3 in order to control driving of the auxiliary vehicle 3.

The driver assistance system 100 of the vehicle 2 calculates a request value to the driver assistance system 100A of the auxiliary vehicle 3 based on the pieces of image data ID20A, ID21A, the pieces of point group data PD30A to PD33A, and the pieces of distance data DD40A to DD43A.

The vehicle 2 transmits request signals ACL 1B, BRK 1B, STR 1B to the auxiliary vehicle 3. Upon receiving the request signals ACL 1B, BRK 1B, STR 1B, the communication device 10A of the auxiliary vehicle 3 transmits them to the actuator system 300A of the auxiliary vehicle 3.

The actuator system 300A is driven based on the received request signals ACL 1B, BRK 1B, STR 1B. Then, the actuator system 300A transmits response signals ACL 2B, BRK 2B, STR 2B, VSS 2B to the motion manager 200 via the communication device 10A.

Upon receiving the response signals ACL 2B, BRK 2B, STR 2B, VSS 2B, the motion manager 200 transmits a response signal PLN 20B to the driver assistance system 100.

As such, in the vehicle system 1 according to the present embodiment, when the auxiliary vehicle 3 assists the traveling of the vehicle 2, the vehicle 2 can control driving of the auxiliary vehicle 3. As a result, the vehicle 2 can suitably control the vehicle 2 and the auxiliary vehicle 3 traveling in a row or the like.

Figure 7:
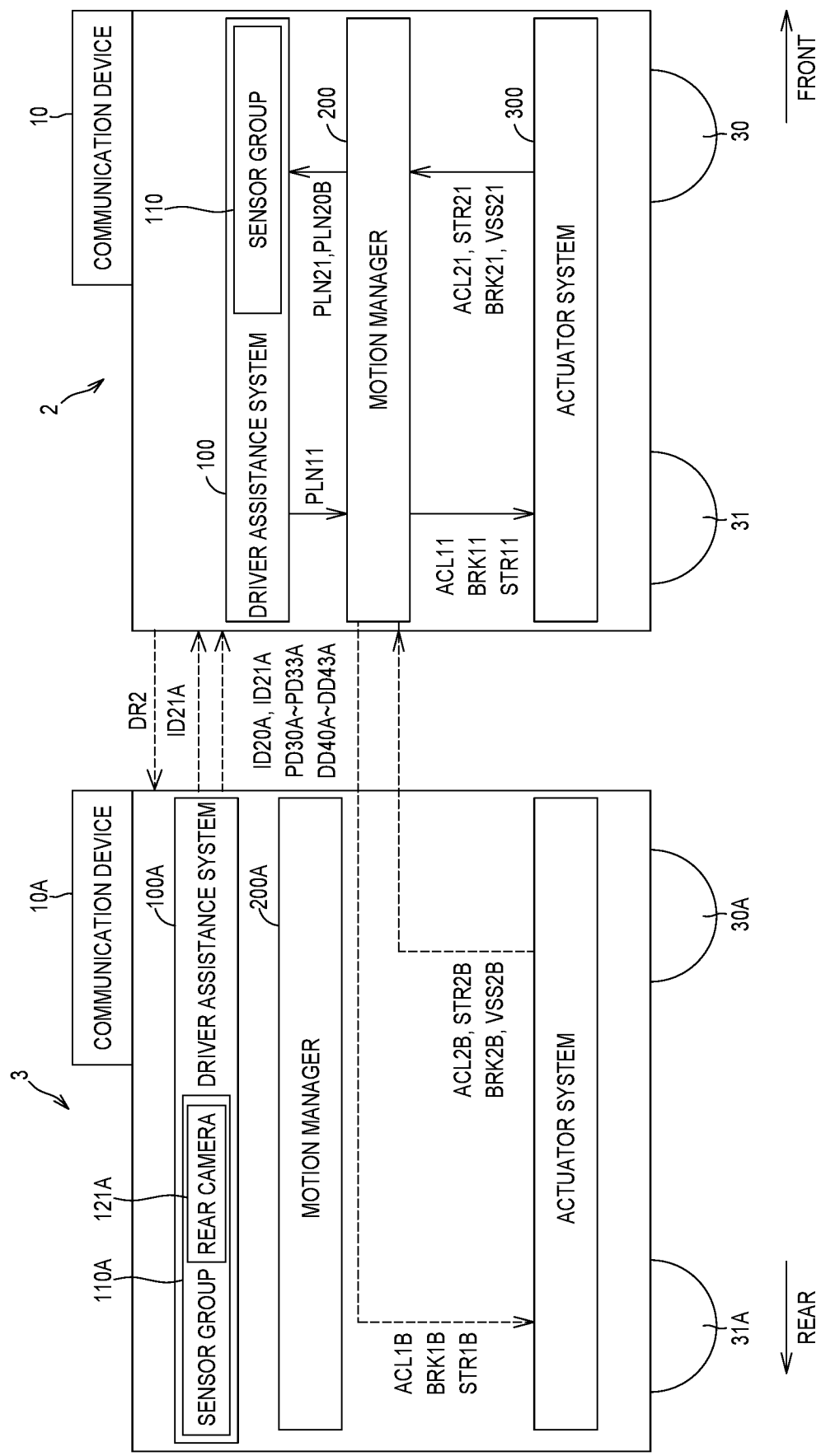
FIG. 7 is a diagram illustrating a state in which the vehicle travels using a rear laser of the auxiliary vehicle according to one embodiment.

FIG. 7 is a diagram illustrating a situation where the auxiliary vehicle 3 travels while assisting the vehicle 2 when the sensor that acquires information on the rear area of the vehicle 2 has failed.

In an example illustrated in FIG. 7, a case where an abnormality has occurred in the rear camera 121 of the vehicle 2 is described.

When communication with the auxiliary vehicle 3 is established, the vehicle 2 transmits the traveling request DR2 to the auxiliary vehicle 3. Upon receiving the traveling request DR2, the auxiliary vehicle 3 is controlled such that it travels in the rear of the vehicle 2. The traveling request DR2 includes information specifying the failed sensor. In the example illustrated in FIG. 7, the traveling request DR2 includes information indicating that the rear camera 121 has failed.

Upon receiving the traveling request DR2, the auxiliary vehicle 3 transmits the image data ID21A of the rear camera 121A to the vehicle 2.

The communication device 10 transmits the received image data ID21A to each application of the driver assistance system 100. The sensor group 110 transmits the image data ID20, the pieces of point group data PD30 to PD33, and pieces of distance data DD40 to DD43 to the driver assistance system 100.

Each application of the driver assistance system 100 calculates a request value (a request signal PLN 11) to the motion manager 200 based on the pieces of image data ID20, ID21A, the pieces of point group data PD30 to PD33, and the pieces of distance data DD40 to DD43. Then, the driver assistance system 100 transmits the request signal PLN 11 to the motion manager 200. The motion manager 200 calculates request signals ACL 11, BRK 11, STR 11 based on the request signal PLN 11, and transmits them to the actuator system 300.

The actuator system 300 transmits response signals ACL 21, BRK 21, STR 21, VSS 21 to the motion manager 200. The motion manager 200 transmits a response signal PLN 21 to the driver assistance system 100 based on the received response signals. In this manner, the vehicle 2 can execute the autonomous driving traveling or the driver assistance traveling using the data of the sensor (the rear camera 121A) of the auxiliary vehicle 3.

In the examples illustrated in FIGS. 6 and 7, respectively, the case where there are abnormalities in the front laser 140 and the rear camera 121 is illustrated as an example, but the present disclosure is not limited thereto. When there is an abnormality in another sensor, the same control is also executed.

Control when there is an Abnormality in an Actuator

As illustrated in FIG. 8, the vehicle 2 includes a connection unit 35 and a connection unit 36 that are connected with the auxiliary vehicle 3. The connection unit is provided on a front side of the vehicle 2. The connection unit 36 is provided on a rear side of the vehicle 2.

In an example illustrated in FIG. 8, the auxiliary vehicle 3 assists the traveling of the vehicle 2 in a state where an abnormality has occurred in the hydraulic brake 33 of the vehicle 2. The auxiliary vehicle 3 is connected to the connection unit 36 by a connection member 37 connected to the connection unit 36, and positioned in the rear of the vehicle 2.

The vehicle 2 establishes communication with the auxiliary vehicle 3 before traveling using the auxiliary vehicle 3. Then, the vehicle 2 transmits a traveling request DR3 to the auxiliary vehicle 3. This traveling request DR3 includes a request signal requesting for connection to the auxiliary vehicle 3 by the connection member 37, information specifying the actuator in which an abnormality has occurred, and information specifying data requested to the auxiliary vehicle 3.

In the example illustrated in FIG. 8, the traveling request DR3 includes information indicating that a failure has occurred in the hydraulic brake 33. Further, the traveling request DR3 includes information requesting for the image data ID21A, the point group data PD31A, and the distance data DD41A from the auxiliary vehicle 3.

Then, upon detecting connection to the connection unit 36, the auxiliary vehicle 3 transmits the image data ID21A, the point group data PD31A, and the distance data DD41A to the vehicle 2.

The communication device 10 transmits the image data ID21A, the point group data PD31A, and the distance data DD41A that are received from the auxiliary vehicle 3 to each application of the driver assistance system 100. Data from each sensor of the sensor group 110 is also transmitted to each application of the driver assistance system 100.

The driver assistance system 100 of the vehicle 2 calculates a request value (a request signal PLN 12) to the motion manager 200 based on the image data ID21A, the point group data PD31A, the distance data DD41A, and various pieces of data of the sensor group 110. Specifically, the driver assistance system 100 calculates the above request value based on the image data ID21A, the point group data PD31A, the distance data DD41A, the image data ID20, the point group data PD (30, 32, 33), and the distance data DD (40, 42, 43). Then, the driver assistance system 100 inputs the request signal PLN 12 to the motion manager 200.

The motion manager 200 calculates a request signal ACL 12, a request signal BRK 12, and a request signal STR 12 based on the request signal PLN 12, and inputs each request signal to the actuator system 300. Then, the actuator system 300 transmits response signals ACL 22, BRK 22, STR 22, VSS 22 to the motion manager 200. The motion manager 200 transmits a response signal PLN 22 to the driver assistance system 100 based on the received response signals.

In the example illustrated in FIG. 8, the vehicle 2 also controls driving of the auxiliary vehicle 3. As such, even in a state where the hydraulic brake 33 of the vehicle 2 is not driven, by driving at least one of the hydraulic brakes 32A and 33A of the auxiliary vehicle 3, it is possible to decelerate or stop the vehicle 2.

Specifically, the communication device 10 of the vehicle 2 acquires various pieces of data from the sensor group 110A and transmits the acquired various pieces of data to each application of the driver assistance system 100. The driver assistance system 100 (the motion manager 200) calculates request signals ACL 11B, BRK 11B, STR 11B based on the various pieces of data from the sensor group 110A, and transmits them to the actuator system 300A.

Here, when the vehicle 2 needs to be decelerated or stopped, the driver assistance system 100 (the motion manager 200) drives the hydraulic brake 33A of the auxiliary vehicle 3. Specifically, the driver assistance system 100 (the motion manager 200) increases a brake force of at least one of the hydraulic brakes 32A and 33A using the request signal BRK 11B. Further, when the drive force of the power train system 302A of the auxiliary vehicle 3 is to be decreased, the driving force of the power train system 302A may be decreased using the request signal ACL 11B.

Then, the actuator system 300A transmits response signals ACL 12B, BRK 12B, STR 12B, VSS 12B to the motion manager 200 via the communication device 10A. Upon receiving the response signals ACL 12B, BRK 12B, STR 12B, VSS 12B, the motion manager 200 transmits a response signal PLN 22B to the driver assistance system 100.

With such a vehicle system, even when an abnormality has occurred in the hydraulic brake 33 of the vehicle 2 using, for example, the data from the auxiliary vehicle 3 and the hydraulic brake of the auxiliary vehicle 3, it is possible for the vehicle 2 to execute the autonomous driving traveling or the driver assistance traveling.

Further, in the above example, an example where the auxiliary vehicle 3 is arranged in the rear of the vehicle 2, and the vehicle 2 and the auxiliary vehicle 3 travel is described, but the auxiliary vehicle 3 may travel in front of the vehicle 2. Further, when an abnormality has occurred in the hydraulic brake 32, the same control may also be executed. Further, when an abnormality has occurred in a predetermined actuator of the vehicle 2 other than the hydraulic brake (the brake system), the same auxiliary control as above may be executed using the actuator of the auxiliary vehicle 3 having the same function as the predetermined actuator.

Figure 9:
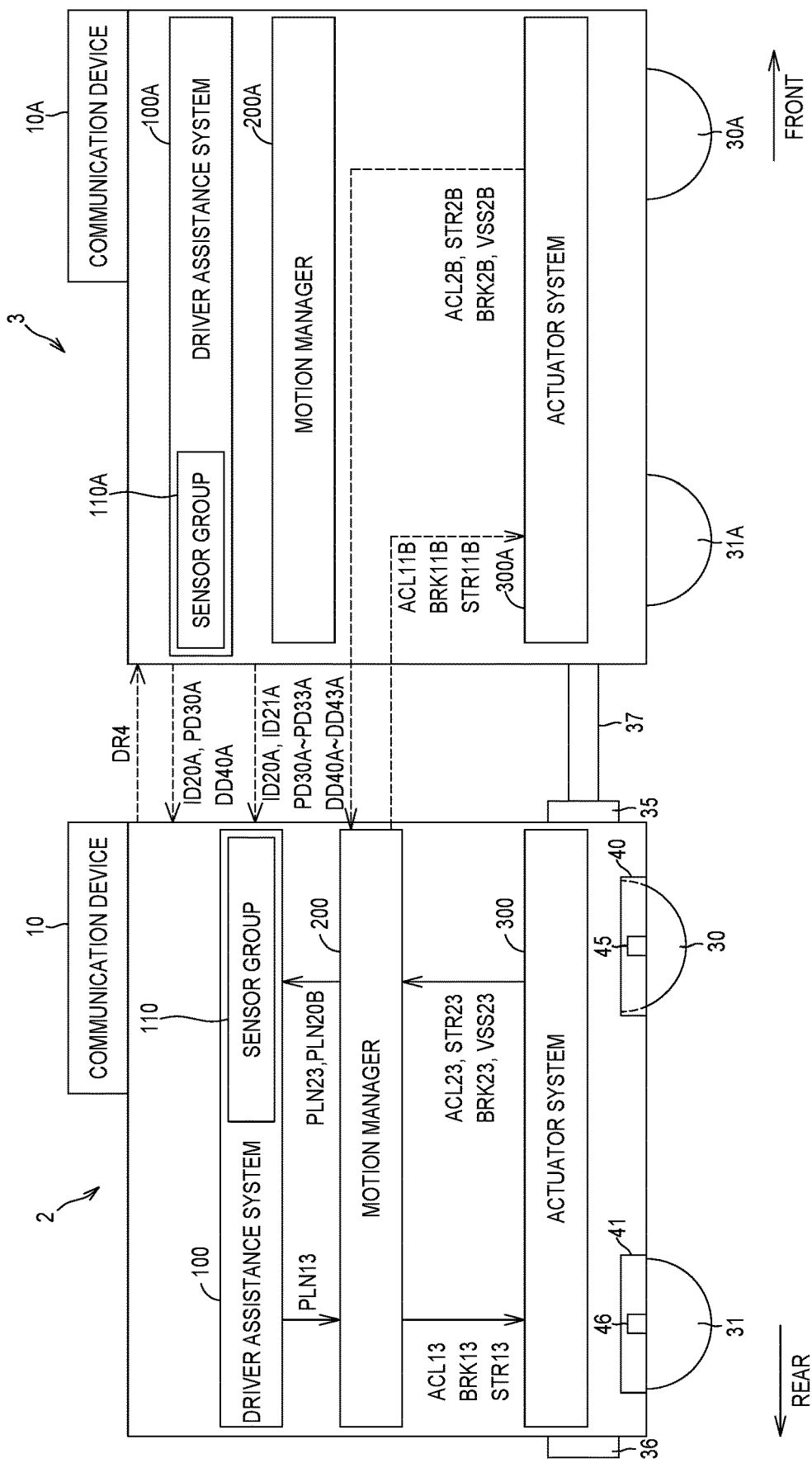
FIG. 9 is a diagram illustrating a state in which the vehicle travels using a hydraulic pressure brake of the auxiliary vehicle according to one embodiment.

Further, as illustrated in FIG. 9, the sensor group 308 (see FIG. 2) of the actuator system 300 includes tire pressure sensors 45 and 46. The tire pressure sensor 45 measures air pressure of the front wheels 30. The tire pressure sensor 46 measures air pressure of the rear wheels 31.

Further, the vehicle 2 further includes a lifting device 40 and a lifting device 41. The lifting device 40 lifts the front wheels 30. The lifting device 41 lifts the rear wheels 31. The lifting devices 40 and 41 are examples of a "movement device" in the present disclosure.

The lifting device 40 can lift and lower a pair of front wheels 30 independently of each other. Further, the lifting device 41 can lift and lower a pair of rear wheels 31 independently of each other. The pair of front wheels 30 may be lifted and lowered in conjunction with each other by the lifting device 40. Further, the pair of rear wheels 31 may be lifted and lowered in conjunction with each other by the lifting device 41.

Each of tire pressure sensors 45 and 46 transmits the measured air pressure to the control device 11. Upon determining that air pressure of each tire is equal to or lower than a predetermined value, the control device 11 display, on the display unit 13, a warning indicating that the tire pressure is equal to or lower than the predetermined value, and a notification indicating that the autonomous driving traveling and the driver assistance traveling is stopped after a predetermined time elapses. Further, the warning displayed on the display unit 13 may include a notification indicating that the user is recommended to stop.

In an example illustrated in FIG. 9, the air pressure of the front wheels 30 is lower than the predetermined value. After communication with the auxiliary vehicle 3 is established, the vehicle 2 transmits a traveling request DR4 to the auxiliary vehicle 3. The traveling request DR4 includes information indicating that the air pressure of the front wheels 30 is low and a signal requesting that the auxiliary vehicle 3 be connected to the connection unit 35. When the traveling request DR4 is received, the auxiliary vehicle 3 connects the vehicle 2 to the connection unit 35 by the connection member 37.

When the air pressure of the rear wheels 31 is equal to or lower than the predetermined value, the vehicle 2 transmits, to the auxiliary vehicle 3, the traveling request DR4 including information indicating that the air pressure of the rear wheels 31 is low and a signal requesting to connect the auxiliary vehicle 3 to the connection unit 36.

Upon detecting the connection of the auxiliary vehicle 3 to the connection unit 35, the vehicle 2 drives the lifting device 40 by the control device 11 (see FIG. 2) and increases the front wheels 30. As a result, at least part of the front wheel 30 is housed inside the vehicle 2. Then, the front wheel 30 becomes a state of being lifted from the ground.

In the state where the auxiliary vehicle 3 is connected to the vehicle 2, even when the front wheels 30 are lifted, the vehicle 2 becomes a state of being capable of traveling by being supported by the auxiliary vehicle 3.

With the vehicle system 1, even when the air pressure of the front wheels of the vehicle 2 is low, the vehicle 2 becomes the state of being capable of traveling while being connected to the auxiliary vehicle 3.

In this case, the motion manager 200 of the vehicle 2 may control the actuator system 300A of the auxiliary vehicle 3 and control the traveling (for example, the drive force, the brake force, and the steering angle) of the auxiliary vehicle 3.

Further, in the example illustrated in FIG. 9, the traveling request DR4 includes information indicating that the air pressure of the front wheel 30 is low, and information requesting for the image data ID20A, the point group data PD30A, and the distance data DD40A from the auxiliary vehicle 3.

Then, upon detecting the connection to the connection unit 35, the auxiliary vehicle 3 transmits the image data ID20A, the point group data PD30A, and the distance data DD40A to the vehicle 2.

The communication device 10 transmits the image data ID20A, the point group data PD30A, and the distance data DD40A that are received from the auxiliary vehicle 3 to each application of the driver assistance system 100. Data from each sensor of the sensor group 110 is also transmitted to each application of the driver assistance system 100.

The driver assistance system 100 of the vehicle 2 calculates a request value (a request signal PLN 13) to the motion manager 200 based on the image data ID20A, the point group data PD30A, the distance data DD40A, and various pieces of data of the sensor group 110. Specifically, the driver assistance system 100 calculates the above request value based on the image data ID20A, the point group data PD30A, the distance data DD40A, the image data ID21, the point group data PD (31 to 33), and the distance data DD (41 to 43). Then, the driver assistance system 100 inputs the request signal PLN 13 to the motion manager 200.

Then, the motion manager 200 transmits request signals ACL 13, BRK 13, STR 13 to the actuator system 300. Then, the actuator system 300 transmits response signals ACL 23, BRK 23, STR 23, VSS 23 to the motion manager 200. The motion manager 200 transmits a response signal PLN 23 to the driver assistance system 100 based on the received response signals.

Further, in the above example, an example where the auxiliary vehicle 3 is arranged in front of the vehicle 2 of which the front wheel 30 has failed is described, but the auxiliary vehicle 3 may travel in the rear of the vehicle 2 of which the rear wheel 31 has failed. In this case, the rear wheel 31 is lifted by the lifting device 41.

In the above embodiment, an example where the control device 11 included in the vehicle 2 assists the traveling of the vehicle 2 using the sensor and actuator of the auxiliary vehicle 3 is described, but the present disclosure is not limited thereto. The control device that executes assistance may be included in the auxiliary vehicle 3 or may be provided outside the vehicle 2 and the auxiliary vehicle 3.

Further, in the above embodiment, an example where the motion manager 200 of the vehicle 2 controls the actuator system 300 using an input from each sensor of the auxiliary vehicle 3 when an abnormality has occurred in the sensor of the vehicle 2, and an example where the motion manager 200 of the vehicle 2 controls the actuator system 300A when an abnormality has occurred in the actuator of the vehicle 2 are described, but the present disclosure is not limited thereto. The motion manager 200A of the auxiliary vehicle 3 may execute each of the above control.

Further, in the above embodiment, an example where the actuator system 300 is controlled using the input from each sensor of the auxiliary vehicle 3 when an abnormality has occurred in the sensor of the vehicle 2, and an example where the actuator system 300A is controlled when an abnormality has occurred in the actuator of the vehicle 2 are described, but the present disclosure is not limited thereto. Only one of the above two examples may be executed.

Further, in the above embodiment, an example where the vehicle 2 and the auxiliary vehicle 3 are not connected when the vehicle 2 travels using each sensor of the auxiliary vehicle 3 when an abnormality has occurred in the sensor of the vehicle 2 is described, but the present disclosure is not limited thereto. The vehicle 2 and the auxiliary vehicle 3 may be connected. Further, when the vehicle 2 travels using the actuator system 300A when an abnormality has occurred in the actuator of the vehicle 2, the vehicle 2 and the auxiliary vehicle 3 does not have to be connected.

What is claimed is:

1. A vehicle control device mounted on a vehicle configured to travel using an auxiliary vehicle that includes at least one auxiliary sensor and at least one auxiliary actuator, the vehicle control device comprising:
   a processor configured to, upon detecting an abnormality in at least one in-vehicle sensor, implement at least one of a first switching control that controls driving of at least one in-vehicle actuator using an input from the auxiliary sensor and a second switching control that causes the vehicle to travel by controlling driving of the auxiliary actuator,
   wherein the vehicle includes:
   the in-vehicle sensor configured to acquire information of an external environment of the vehicle;
   the in-vehicle actuator used in traveling of the vehicle;
   an in-vehicle control unit configured to control the driving of the in-vehicle actuator using an input from the in-vehicle sensor; and
   a communicator configured to communicate with the auxiliary vehicle;
   a connection unit configured to connect the auxiliary vehicle;
   a plurality of in-vehicle actuators, the in-vehicle actuators including a first in-vehicle actuator configured to exhibit a first function for the traveling of the vehicle and a second in-vehicle actuator configured to exhibit a second function for the traveling of the vehicle;

a wheel used while the vehicle is driving; and
a movement device configured to move the wheel upward;
wherein the auxiliary vehicle includes a plurality of auxiliary actuators, the auxiliary actuators including a first auxiliary actuator configured to have a first function for traveling of the auxiliary vehicle and a second auxiliary actuator configured to have a second function for the traveling of the auxiliary vehicle; and
wherein the processor is configured to:
upon detecting the abnormality in the first in-vehicle actuator, cause the auxiliary vehicle to travel using the first auxiliary actuator while the auxiliary vehicle is connected; and
upon detecting an abnormality in the wheel, move the wheel upward using the movement device while the auxiliary vehicle is connected.

2. The vehicle control device according to claim 1, wherein:
the auxiliary vehicle includes an auxiliary control unit configured to control driving of the auxiliary actuator using the input from the auxiliary sensor; and
the auxiliary vehicle is configured to implement at least one of the first switching control and the second switching control using any one of the in-vehicle control unit and the auxiliary control unit.

3. The vehicle control device according to claim 1, wherein:
the vehicle includes a plurality of in-vehicle sensors;
the in-vehicle sensors include a first in-vehicle sensor configured to acquire first information from the external environment and a second in-vehicle sensor configured to acquire second information from the external environment;
the auxiliary vehicle includes a plurality of auxiliary sensors;
the auxiliary sensors include a first auxiliary sensor configured to acquire the first information from the external environment and a second auxiliary sensor configured to acquire the second information from the external environment; and
the processor is configured to, upon detecting the abnormality in the first in-vehicle sensor, control driving of the in-vehicle actuator using the first auxiliary sensor.

4. The vehicle control device according to claim 3, wherein:
the first in-vehicle sensor and the second in-vehicle sensor are configured to acquire information of the external environment in front of the vehicle, the first in-vehicle sensor having a detection distance that is longer than a detection distance of the second in-vehicle sensor; and
the first auxiliary sensor and the second auxiliary sensor are configured to acquire information of the external environment in front of the auxiliary vehicle and a detection distance of the first auxiliary sensor is longer than a detection distance of the second auxiliary sensor.

5. A vehicle configured to communicate with an auxiliary vehicle that includes at least one auxiliary sensor and at least one auxiliary actuator, the vehicle comprising;
at least one in-vehicle sensor configured to acquire information of an external environment of the vehicle;
at least one in-vehicle actuator used in traveling of the vehicle;
a control unit configured to control driving of the in-vehicle actuator using an input from the in-vehicle sensor; and
a communicator configured to communicate with the auxiliary vehicle;
a connection unit configured to connect the auxiliary vehicle;
a plurality of in-vehicle actuators, the in-vehicle actuators including a first in-vehicle actuator configured to exhibit a first function for the traveling of the vehicle and a second in-vehicle actuator configured to exhibit a second function for the traveling of the vehicle;
a wheel used while the vehicle is driving; and
a movement device configured to move the wheel upward;
wherein the control unit is configured to, upon detecting an abnormality in the in-vehicle sensor, implement at least one of a first switching control that controls the driving of the in-vehicle actuator based on an input from the auxiliary sensor, and a second switching control that causes the vehicle to travel using the auxiliary actuator;
wherein the auxiliary vehicle includes a plurality of auxiliary actuators, the auxiliary actuators including a first auxiliary actuator configured to have a first function for traveling of the auxiliary vehicle and a second auxiliary actuator configured to have a second function for the traveling of the auxiliary vehicle; and
wherein the control unit is configured to:
upon detecting the abnormality in the first in-vehicle actuator, cause the auxiliary vehicle to travel using the first auxiliary actuator while the auxiliary vehicle is connected; and
upon detecting an abnormality in the wheel, move the wheel upward using the movement device while the auxiliary vehicle is connected.

6. A vehicle system comprising:
an auxiliary vehicle that includes at least one auxiliary sensor and at least one auxiliary actuator; and
a vehicle configured to communicate with the auxiliary vehicle, wherein:
the vehicle includes:
at least one in-vehicle sensor configured to acquire information of an external environment of the vehicle;
at least one in-vehicle actuator used in traveling of the vehicle;
a vehicle control device configured to control driving of the in-vehicle actuator using an input from the in-vehicle sensor; and
a communicator configured to communicate with the auxiliary vehicle;
a connection unit configured to connect the auxiliary vehicle;
a plurality of in-vehicle actuators, the in-vehicle actuators including a first in-vehicle actuator configured to exhibit a first function for the traveling of the vehicle and a second in-vehicle actuator configured to exhibit a second function for the traveling of the vehicle;
a wheel used while the vehicle is driving; and
a movement device configured to move the wheel upward;
the vehicle control device is configured to, upon detecting an abnormality in the in-vehicle sensor, implement at least one of a first switching control that controls the driving of the in-vehicle actuator based on an input from the auxiliary sensor, and a second switching control that causes the vehicle to travel using the auxiliary actuator;

the auxiliary vehicle includes a plurality of auxiliary actuators, the auxiliary actuators including a first auxiliary actuator configured to have a first function for traveling of the auxiliary vehicle and a second auxiliary actuator configured to have a second function for the traveling of the auxiliary vehicle; and the vehicle control device is configured to:
- upon detecting the abnormality in the first in-vehicle actuator, cause the auxiliary vehicle to travel using the first auxiliary actuator while the auxiliary vehicle is connected; and
- upon detecting an abnormality in the wheel, move the wheel upward using the movement device while the auxiliary vehicle is connected.

* * * * *